(12) United States Patent
Azuma

(10) Patent No.: US 9,661,550 B2
(45) Date of Patent: May 23, 2017

(54) COMMUNICATION APPARATUS, COMMUNICATION METHOD, AND COMMUNICATION SYSTEM

(71) Applicant: Yoshikazu Azuma, Tokyo (JP)

(72) Inventor: Yoshikazu Azuma, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 193 days.

(21) Appl. No.: 14/570,001

(22) Filed: Dec. 15, 2014

(65) Prior Publication Data

US 2015/0181499 A1   Jun. 25, 2015

(30) Foreign Application Priority Data

Dec. 20, 2013   (JP) .................................. 2013-263972

(51) Int. Cl.
| | |
|---|---|
| *H04W 72/04* | (2009.01) |
| *H04W 40/12* | (2009.01) |
| *H04L 12/715* | (2013.01) |
| *H04L 12/803* | (2013.01) |
| *H04L 12/24* | (2006.01) |
| *H04W 92/14* | (2009.01) |

(52) U.S. Cl.
CPC ......... *H04W 40/12* (2013.01); *H04L 41/0803* (2013.01); *H04L 45/64* (2013.01); *H04L 47/122* (2013.01); *H04W 92/14* (2013.01)

(58) Field of Classification Search
CPC ... H04W 16/14; H04W 8/005; H04W 74/002; H04W 48/16; H04W 8/00
See application file for complete search history.

(56) References Cited

U.S. PATENT DOCUMENTS

| | | | |
|---|---|---|---|
| 2012/0170477 A1* | 7/2012 | Hieda | H04L 12/4625 370/252 |
| 2015/0029846 A1* | 1/2015 | Liou | H04L 47/122 370/230.1 |
| 2015/0124595 A1* | 5/2015 | Yamagata | H04L 63/02 370/230 |
| 2015/0163150 A1* | 6/2015 | Beheshti-Zavareh | H04L 45/121 370/400 |

FOREIGN PATENT DOCUMENTS

| | | |
|---|---|---|
| JP | 2009-260821 | 11/2009 |
| WO | 2011/087085 | 7/2011 |

\* cited by examiner

*Primary Examiner* — Lakeram Jangbahadur
(74) *Attorney, Agent, or Firm* — Cooper & Dunham LLP

(57) ABSTRACT

Disclosed is a communication apparatus capable of performing communications with another communication apparatus. The communication apparatus includes a plurality of communication interfaces using different communication paths, an information acquisition part configured to acquire information associated with the communication paths available to the communication apparatus and the other communication apparatus, a controller configured to select one of the communication interfaces for use in the communications with the other communication apparatus based on the information associated with the communication paths acquired from the information acquisition part, and a switcher configured to switch the communication interface used by the communication apparatus to the communication interface selected by the controller.

11 Claims, 9 Drawing Sheets

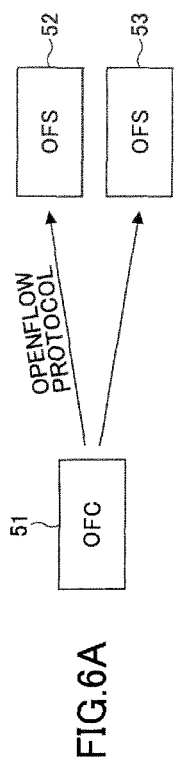
FIG.6A
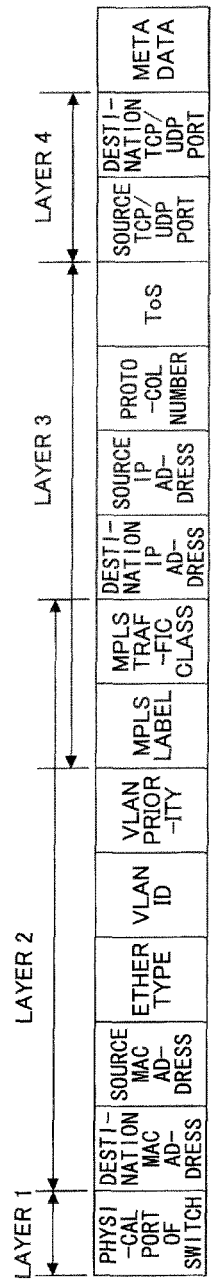
FIG.6B
FIG.6C

COMMUNICATION APPARATUS, COMMUNICATION METHOD, AND COMMUNICATION SYSTEM

BACKGROUND OF THE INVENTION

1. Field of the Invention

The disclosures discussed herein relate to a communication apparatus, a communication method, and a communication system.

2. Description of the Related Art

Wired communications between communication apparatuses are generally performed via Ethernet (registered trademark) whereas wireless communications between communication apparatuses are generally performed via a wireless LAN known as 3G/LTE long term evolution) or WiFi. Advances in recent technologies have encouraged frequent transmissions of large sized data, and the widespread use of communication apparatuses results in an increase in transmissions of significant quantities of data. Thus, significant congestion may be observed in communication networks.

The wireless communications are becoming popular along with the widespread use of wireless technologies such as wireless mobile communication apparatuses. However, a communication apparatus having the communication capability of LTE and 4 GHz/5 GHz dual band WiFi may exhibit inefficient communication operations. For example, although the communication apparatus has a WiFi communication environment capable of performing wireless communications at close range, the communication apparatus may use LTE configured to perform wireless communications at long range. Similarly, the communication apparatuses may use a congested 2.4 GHz band despite the fact that the 5 GHz band is available between the communication apparatuses. The above communication operations may be inefficient in terms of performance and radio utilization efficiency.

Recently, the concept called "software-defined networking" (SDN) has attracted attention. The SDN refines network operations with software statements, and its technical components include network virtualization and OpenFlow switching. The network virtualization is a technology to virtually separate a logical network configuration from a physical network configuration by combining physical network apparatuses, virtual network components, and protocol technologies to achieve a flexible network configuration unrestricted by a physical configuration.

The OpenFlow switching is a technology to identify communications as an end-to-end flow to separate a control plane and a data plane. The control plane serves as a part configured to analyze data, determine forwarding destinations, and determine controls, and the data plane serves as a part configured to physically transmit packets. In the OpenFlow switching technology, an OpenFlow controller (OFC) that manages a process of the control plane transmits forwarding rule instructions, and an OpenFlow switch (OFS) that manages a process of the data plane forwards packets in accordance with the forwarding rule instructions. More specifically, the OFS forwards packets in accordance with a flow table held by the OFC configured to add data or rewrite data. The above-described technique may enable the OpenFlow switching technology to serve as a tool for controlling the network virtualization.

The related art SDN technologies are rapidly becoming popular for use in Web/Cloud data centers or communication carrier backbones (large capacity communication networks) that are susceptible to concentration of communication load. The optimal control of the SDN technologies may improve efficiency in communication traffic, and may achieve the reduction in cost or energy.

Patent Document 1 proposes a technology that employs the above-described OpenFlow switching technology. The proposed technology selects a desired one of virtual switches connected to different physical network interface (NIC) devices, and uses the selected virtual switch for transmitting packets. In this technology, a physical network interface device that will not fail may be selected without allowing a user to set routing control information.

The optimization of communications by the SDN is increasingly applied in the Web/Cloud data centers or the like that are susceptible to concentration of communication loads. However, little optimization of communications by the SDN is achieved in terminal side apparatuses that communicate with the Web/Cloud data centers or the like despite the fact that virtual network components and the like similar to those used in the Web/Cloud data centers are available to the terminal side apparatuses. In wireless communications increasingly used by terminals, which anticipate a rapid increase in transmissions of large amounts of packet communications such as transmissions of high resolution moving video data or the like, unoptimized communications of the terminals may adversely affect communications of other peripheral terminals due to frequency sharing wireless communication properties. This may eventually degrade or damage communication performance of the terminals.

The technology disclosed in Patent Document 1 is configured to merely perform switching operations to switch the physical NIC in accordance with transmission destinations, and does not flexibly perform optimal controls in accordance with capacities frequency channels or communication paths of both terminals. Thus, the technology disclosed in Patent Document 1 is rot configured to handle degradation of or damage to the communication performance of the terminals.

RELATED ART DOCUMENT

Patent Document 1: WO 2011/087085

SUMMARY OF THE INVENTION

Accordingly, it is a general object in ore embodiment of the present invention to provide a communication apparatus, a communication method, and a communication system capable of flexibly performing optimal controls in accordance with capacities of available frequency channels or communication paths of both terminals that substantially obviate one or more problems caused by the limitations and disadvantages of the related art.

In one aspect of the embodiment, there is provided a communication apparatus capable of performing communications with another communication apparatus. The communication apparatus includes a plurality of communication interfaces using different communication paths, an information acquisition part configured to acquire communication associated with the communication paths available to the communication apparatus and the other communication apparatus, a controller configured to select one of the communication interfaces for use in the communications with the other communication apparatus based on the information associated with the communication paths acquired from the information acquisition part, and a switcher configured to switch the communication interface used by the communication apparatus to the communication interface selected by the controller.

Other objects, features and advantages of the present invention will become more apparent from the following detailed description when read in conjunction with the accompanying drawings.

BRIEF DESCRIPTION OF THE DRAWINGS

FIGS. 6A to 6C are diagrams illustrating a concept of Openflow switching implemented in the communication apparatus;

DETAILED DESCRIPTION OF THE PREFERRED EMBODIMENTS

Figure 1:
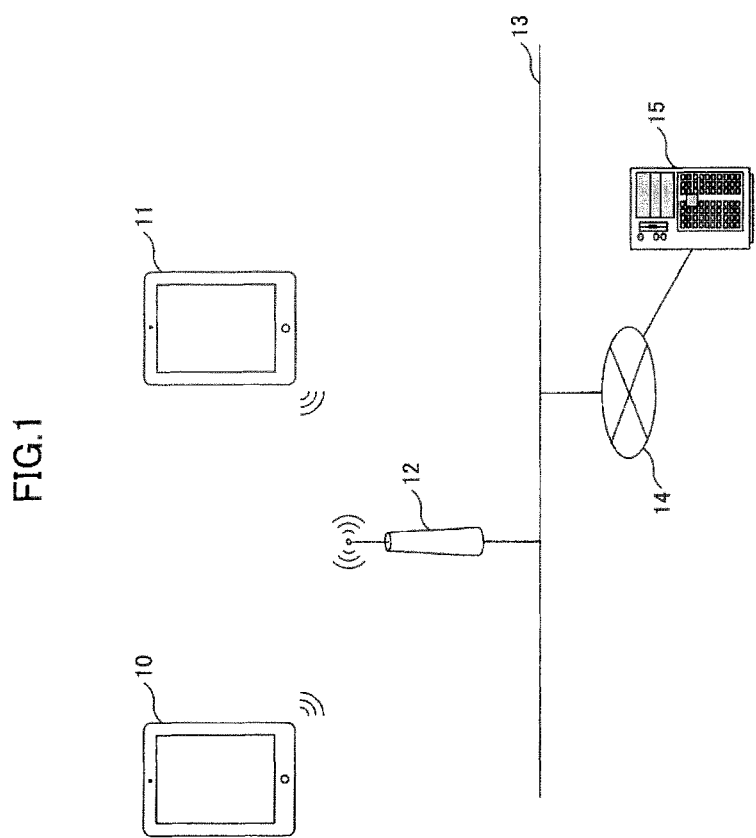
FIG. 1 is a diagram illustrating a configuration example of a communication system including communication apparatuses of an embodiment.

FIG. 1 is a diagram illustrating configuration example of a communication system including two communication apparatuses that communicate with each other. To identify the two communication apparatuses, one of the communication apparatuses is referred to as a communication apparatus 10, and the other communication apparatus serving as a communication partner is referred to as a communication apparatus 11. Note that the communication system of this embodiment is not limited to a configuration having two communication apparatuses, but may be a configuration having three or more communication apparatuses. The communication apparatuses 10 and 11 are configured to establish connection via wireless communication to exchange information between the communication apparatuses 10 and 11 via the wireless communication. The wireless communication may be performed either directly or via a wireless LAN access point (AP) 12. Further, the wireless communication may also be performed via base stations by utilizing smartphones or the like.

The AP 12 is connected to a local network 13 such as a local area network (LAN) or the like. The local network 13 is connected to a global network 14 such as the Internet, and other apparatuses such as a server 15 are connected to the global network 14. Hence, the communication apparatuses 10 and 11 may be able to access the server 15 via the AP 12, the local area network 13, and the global network 14. In this configuration, the communication apparatuses 10 and 11 may be able to cause the server 15 to execute some kind of processes, and obtain results of such processes. For example, the communication apparatuses 10 and 11 may be able to download data maintained by the server 15 or upload data to the server 15. Further, the server 15 may be utilized for controlling communications between the communication apparatuses 10 and 11.

Each of the communication apparatuses 10 and 11 may be a desktop PC, a note PC, a tablet PC, a printer, a multifunction peripheral (MFP), a digital-still camera, a game apparatus, a smartphone, and the like. That is, the communication apparatuses 10 and 11 may be any apparatuses that are provided with a communication function. For example, the communication apparatuses 10 and 11 may be the same apparatuses such as the same note PCs, or different apparatuses such as the note PC and the MFP. Note that in FIG. 1, tablet terminals are given as the examples of the communication apparatuses 10 and 11.

The communication apparatuses 10 and 11 may be able to use their communication functions to directly communicate with each other with a specific frequency band, or communicate with each other via the AP 12 with different frequency bands. As described above, communications performed between the communication apparatuses 10 and 11 use two or more communication channels or paths.

For example, when information is directly transmitted from the communication apparatus 10 to the communication apparatus 11, the information may be transmitted with an extremely-high frequency of 60 GHz from a transmitter of the communication apparatus 10 to a receiver of another communication apparatus 11. The information transmitted via the AP 12 may, for example, be able to use a 2.4 GHz frequency band or a 5 GHz frequency band. The communication apparatus 10 includes a receiver, and the communication apparatus 11 includes a transmitter. Hence, information transmitted from the transmitter of the communication apparatus 11 may be able to be received by the receiver of the communication apparatus 10 either directly or via the AP 12.

Note that the transmitter may include an oscillator circuit configured to generate high frequency signals, an amplifier circuit configured to amplify the generated high frequency signals, a modulator circuit configured to place information on the high frequency signals, and antenna configured to transmit the high frequency signal carrying the information as radio waves. Further, the receiver may include an antenna configured to receive radio waves, a tuning circuit configured to tune the modulated high frequency signals input into the antenna as radio waves to receive the tuned signals, and a demodulation circuit configured to demodulate the received signals to output the information.

The communication apparatus 10 is configured to transmit or receive a packet, a transfer unit of the communication, as transmission information to the communication apparatus 11, or receiving information from the communication apparatus 11. The packet includes an address of a transmission source and an address of transmission destination of the packet, a type of the packet, and user information. The addresses may include an IP address used for identifying a communication apparatus that uses TCP/IP, and a MAC address, the physical address uniquely allocated to the communication apparatus. Types of packets include a token packet, a data packet, and a handshake packet. The token packet may be issued as a command, or used to transmit a reading or writing request. The data packet may be used to transmit or receive data. The handshake packet may be used to indicate whether date are received. Specifically, the handshake packet may include a an ACK packet indicating a successful receipt, and an NAK packet indicating a failed receipt. The user information includes a user name, and a user ID.

The communication apparatus 10 may be able to acquire information about a capability of each of the ports or a status of the communication apparatus 10 itself by conducting port scanning. Further, the communication apparatus 10 may also be able to acquire information about a capability of each of the ports or a status of the communication apparatus 11 while the communication apparatus 10 performs communications with the communication apparatus 11. The communication apparatus 10 may acquire information by receiving a report from the communication apparatus 11, or by requesting the communication apparatus 11 to transmit the information. The information includes communication channels or paths available to the communication apparatus 10 and the communication apparatus 11. Examples of the information include frequency channels allocated to a frequency band of such as 4 GHz, or communication statuses of the communication paths that use the frequency band.

The communication apparatus 10 determines an optimal communication path for performing communication with the communication apparatus 11 via which the packet is transmitted and received based on information associated with the acquired communication paths, and switches the communication interface so as to transmit or receive the packet via the determined optimal communication path. For example, when the communication apparatus 10 determines the communication interface using a 5 GHz frequency band as being more optimal than the communication interface using a 2.4 GHz frequency band, the communication apparatus 10 switches the communication interface using the 2.4 GHz frequency band to the communication interface using the 5 GHz frequency band to perform communicates with the communication apparatus 11. In this case, the communication apparatus 10 reports the optimal communication path to the communication apparatus 11 to cause the communication apparatus 11 to switch the communication interface using the 2.4 GHz frequency band to the communication interface using the 5 GHz frequency band to use the same communication path of the communication apparatus 10.

The communication apparatus 10 may be able to automatically switch the optimal communication path as described above so as to perform communications via the communication interface using the 2.4 GHz frequency band when there is a close-range wireless communication environment such as a WiFi communication environment, or to perform communications via the communication interface using the 5 GHz frequency band when the communication interface using the 2.4 GHz frequency band is congested. Hence, in the communication system of the first embodiment, it may be possible to implement flexible and optimal control to maximize the performance of communication functions of the communication apparatus 10.

Figure 2:
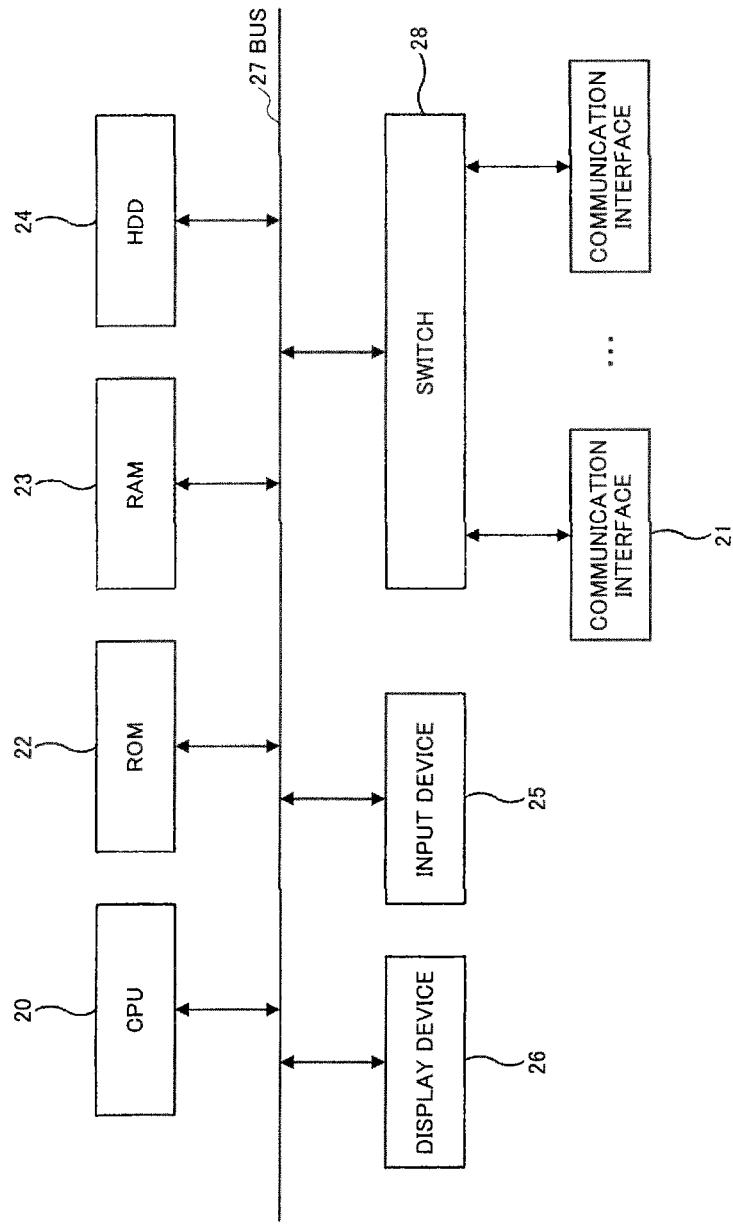
FIG. 2 is a diagram illustrating a hardware configuration of the communication apparatus illustrated in FIG. 1.

Note that the communication apparatuses 10 and 11 have substantially the same primary hardware configurations and functions, and hence, only the hardware configurations and functions of the communication apparatus 10 are illustrated as an example. FIG. 2 is a diagram illustrating an example of a hardware configuration of the apparatus management device 10. The communication apparatus 10 includes a CPU 20 configured to control the overall communication apparatus 10, a storage device configured to store programs read by the CPU 20, two or more communication interfaces 21 configured to perform wired or wireless communications with the other communication apparatuses such as the communication apparatus 11. Each of the communication interfaces 21 may be a transmission-reception module or the like including the above-described transmitter or receiver.

The storage device includes a read-only memory ROM 22, a random access memory RAM 23 configured to serve as a work area of the CPU 20 to execute various types of processes, and a hard disk drive HDD 24 configured to store application programs or various types of data. Note that an example of the HDD 24 in this embodiment is HDD 24; however, a solid state drive SSD may be used instead of the HDD 24. Further, the communication apparatus 10 may include an input device 25 such as an input button or an operations panel, and a display device 26. The communication apparatus 10 further includes a bus 27 via which the above devices are connected, and a switch 28 serving as a switcher disposed between the bus 27 and two or more communication interfaces 21.

The communication apparatus 10 selects the communication interface 21 for causing the CPU 20 to transmit the packet and reports the selection to the switch 28, and the switch 28 subsequently switches to the selected communication interface 21. In this case, the communication apparatus 10 reports the selection to the communication apparatus 11 to switch to the selected communication interface 21 that provides the communication apparatus 11 with the same communication path of the communication apparatus 10. Subsequently, the communication apparatus 10 performs a predetermined process by causing the CPU 20 to read a program stored in the HDD 24 to execute the read program, and generates a packet to be transmitted to the communication apparatus 11. A transmission request of the packet is received from a user, the CPU 20 causes the switch 28 to transmit the packet to one of the communication interfaces 21 connected to the bus 27, and the interface 21 that has received the packet transmits the packet to the communication apparatus 11.

Figure 3:
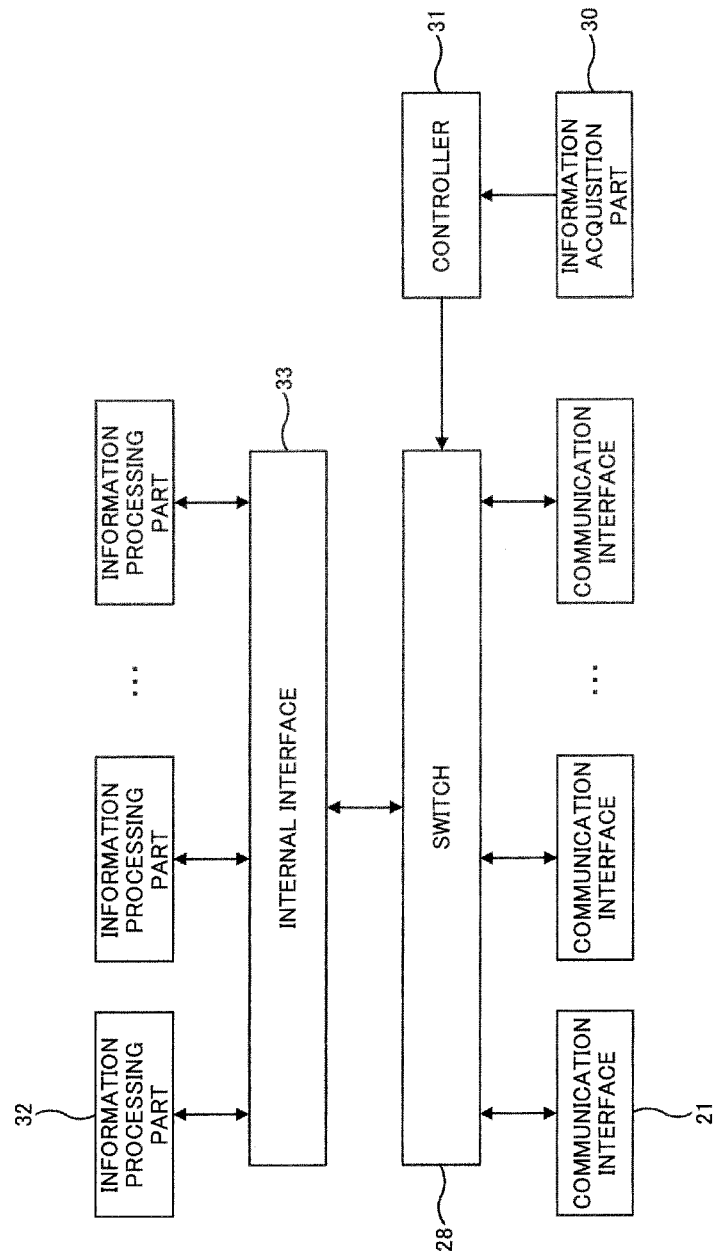
FIG. 3 is a functional block diagram illustrating the communication apparatus illustrated in FIG. 1.

In the following, a description is given of functions provided with the communication apparatus 10 with reference to functional block diagram illustrated in FIG. 3. The communication apparatus 10 includes two or more communication interfaces 21, an information acquisition part 30 configured to acquire information associated with the above-described communication path, a controller 31 configured to select the communication interface 21 used for perform the communication, and the switch 28 configured to switch to the selected communication interface 21. In FIG. 3, the communication apparatus 10 further includes two or more information processing parts 32 configured to execute applications implementing respective functions, and an internal interface 33 serving as an information transfer part connected to the information processing parts 32.

The communication interfaces 21 are configured to perform communications with different communication partner apparatuses via different communication paths. For example, the communication paths may be communication paths having different frequency bands such as 2.4 GHz, 5 GHz, and 60 GHz bands. In this embodiment, examples of only wireless communication paths are illustrated; however, wired communication paths may also be included.

The information acquisition part 30 is configured to acquire information associated with communication paths that are available to the communication apparatus 10 and the communication apparatus 11. The information associated with the communication paths available to the communication apparatus 11 may be acquired by establishing communications between the communication apparatus 10 and the communication apparatus 11 using a dedicated external interface, or using one of the communication interfaces 21, and receiving a report or the like from the communication apparatus 11 in the established communications. When one of the communication interfaces is used for acquiring the information, the communication interface predetermined by default or the like may be used. The information associated with the communication paths is not limited to the above-described examples and the communication interface used immediately before the initiation of the communication may be used.

The controller 31 is configured to select the communication interface 21 for use in the communication with the communication apparatus 11 based on the information associated with the communication paths acquired from the information acquisition part 30. When there is a close-range wireless communication environment such as a WiFi communication environment, the controller 31 selects the communication interface to perform communications sing a 2.4 GHz band or a 5 GHz band. On the other hand, when the 2.4 GHz band is congested, the controller 31 selects the communication interface to perform communications using a 5 GHz band. The controller 31 may be able to select the communication interface 21 based on types of the packets that are transmitted or received in the communication performed. For example, when streaming video or audio data are transmitted, the controller 31 may select streaming interfaces.

The controller 31 initially searches for the communication interfaces available to the communication apparatus 10 and the communication apparatus 11 serving as a communication partner based on the acquired information. When the controller 31 has found only one communication interface, the controller 31 selects that communication interface. On the other hand, when the controller 31 has found two or more communication interfaces, the controller 31 selects one of the communication interfaces that satisfies a reasonable communication status, capability of closer range communication, and both the reasonable communication status and the closer range communication capability. The above standards may be set in advance, and hence, the controller 31 may be able to determine the selection based on the predetermined standards. The standards may include types of packets as described above.

The information associated with the communication paths acquired by the information acquisition part 30 may include information about frequency channels so as to determine whether there is a close range wireless communication environment. The information associated with the communication paths acquired by the information acquisition part 30 may further include information about communication statuses of the communication paths so as to determine whether the communication paths are congested. The above-described information associated with the communication paths acquired by the information acquisition part 30 may be only examples and may further include other information as the information may be optimally controlled.

The information processing part 32 generates a packet to be transmitted to the communication apparatus 11, and outputs the generated packet to the internal interface 33. Further, the information processing part 32 receives a packet from the communication apparatus 11 and optionally executes a predetermined process. In a case of the packet being a display request of option information, the information processing part 32 that receives the packet executes a process to display the optional information. The internal interface 33 is connected to the information processing parts 32 and the switch 28, and transfers packets output by the information processing parts 32 to the switch 28. The internal interface 33 further transfers the packets received by the communication interfaces 21 to the predetermined information processing parts 32.

The switch 28 switches from the communication interface 21 that has been used so far to the communication interface 21 selected by the controller 31. Hence, the switch 28 may be able to transfer a packet received from the internal interface 33 to the selected communication interface 21, and the selected communication interface 21 may be able to transfer the packet received from the switch 28 to the internal interface 33.

The communication interfaces 21 and the internal interface 33 may all be physical interfaces formed of connectors and software drivers. Alternatively, a part of the communication interfaces 21 and the internal interface 33 may be formed of a virtual interface that causes one physical interface to appear to be plural physical interfaces or plural physical interfaces to appear to be one physical interface. The switch 28 may be a physical switch that physically switches a packet transferring destination or a packet receiving source, or a virtual switch that virtually handles one physical switch as plural switches or plural physical switches as one switch.

Figure 4:
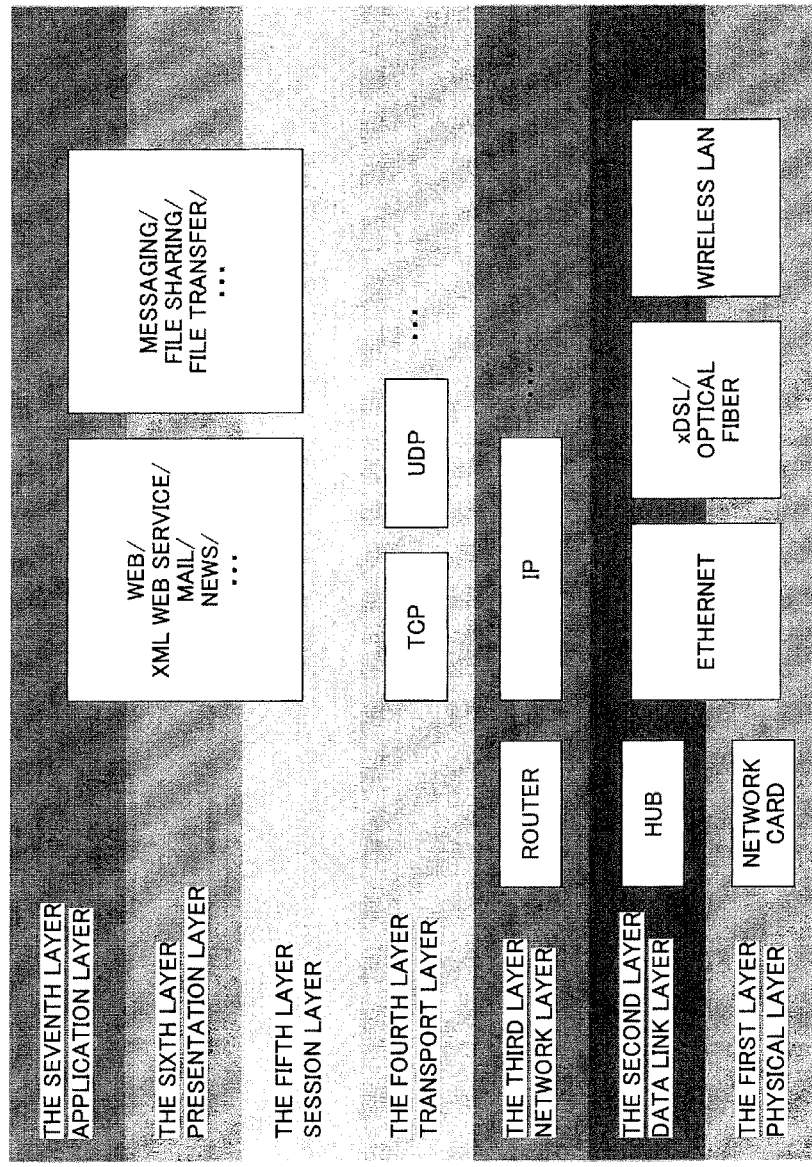
FIG. 4 is a diagram illustrating examples of communication functions implemented in the communication apparatus presented by hierarchical structured models.

Next, an illustration is given, with reference to FIG. 4, of communication functions implemented in the communication apparatus 10. FIG. 4 is a diagram illustrating an example of a model of communication functions by dividing it into hierarchical layers. This model is the open systems interconnection (OSI) model that includes seven layers, from the first layer which is the physical layer to the seventh layer which is the application layer. The current mainstream communication system to exchange IP packets is a horizontal labor specialized division model in which each of the interfaces is defined, individually implemented, and switched in a corresponding one of the hierarchical layers that share an IP of the third layer as common property. IP packet-based applications create sessions between the communication peers based on a concept of a port defined by the fourth layer of the transport layer to perform data communications of each of the services.

Examples of the services include a Web/XML Web service, mail, messaging, file sharing, and file forwarding services as illustrated in the fifth layer to the seventh layer of FIG. 4. The communication layers of the first layer and the second layer may be ignored insofar as the applications providing these services use the TCP/IP or UDP/IP illustrated in the third layer or the fourth layer. Hence, the development of Web services or cloud services may be accelerated compared to a vertical integration model such as a related art phone exchange network. The communication apparatus 10 may basically have a general hardware/software configuration for developing the IP packet-based communication applications illustrated in FIG. 4.

The communication apparatus 10 not only includes two or more communication interfaces 21 illustrated in FIGS. 2 and 3, but also includes the switch 28 serving as a switcher to switch between the communication interfaces 21. An example of the switch 28 may include an OpenFlow switch (OFS). Further, an IP packet application may also be connected to a pert of the OFS via the interface to optionally operate an Openflow controller (OFC).

The OFC is configured to perform communication with the OFS using an OpenFlow protocol. The OFC may use a port status report or switch control function included in the OpenFlow protocol to flexibly perform virtual path control in a form independent of the IP packet communication application. Hence, the communication interfaces may be flexibly and optimally selected by implementing the OFS and OFC used in the OpenFlow switching technology in the communication apparatus 10 so as to maximize the performance of the communication functions of the communication apparatuses 10.

Figure 5A:
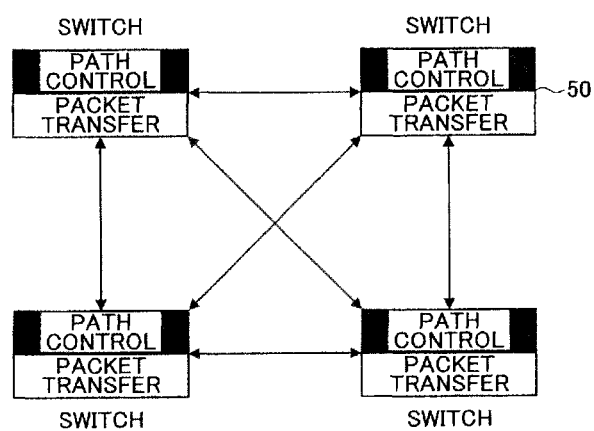
FIGS. 5A and 5B are diagrams illustrating a concept of Openflow switching implemented in the communication apparatus.

In the following, an illustration is given of a concept of the OpenFlow switching with reference to FIGS. 5A and 5B, and FIGS. 6A to 6C. The IP packets transmitted from the communication apparatuses 10 and 11, and the server 15 reach target communication partners via relay apparatuses of wired or wireless communications. In the related art system, as illustrated in FIG. 5A, each of the relay apparatuses performs decentralized autonomous path control to determine a corresponding one of packet transferring destinations. That is, each of the switches 50 includes both a path control function and a packet transfer function to determine a corresponding one of the packet transfer destinations. Hence, each of the switches 50 self-learns information associated with the path control without reporting it to other switches 50 such that the information is fixed to the corresponding switch 50. Further, the functions of the switches 50 are not customized because various functions developed by the apparatus vendor need to be used as the functions of the switches 50.

Figure 5B:
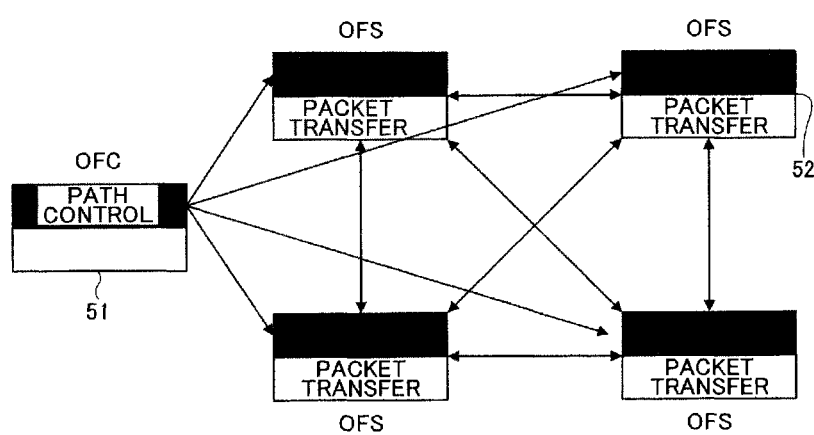

By contrast, in the OpenFlow switching technology, as illustrated in FIG. 5B, the path control functions are removed from the respective switches 50, and the removed path control functions are implemented in the OFC 51. As a result, the OFSs 52 serving as the switches 50 only include packet transfer functions. The information associated with the path control is all managed by the OFC 51, and the OFC 51 centrally controls behaviors of the OFSs. Hence, the path control functions may be more flexible.

This may be represented by the hierarchical structure of the open systems interconnection (OSI) model. That is, the path control functions may be controlled flexibly in the first to the fourth layers of the OSI model. Accordingly, it may be possible to perform path control to change the path of the communication of the TCP port 80 that is generally used in the hypertext transfer protocol (HTTP).

Next, an illustration is given of a specific structure of the OpenFlow switching with reference to FIGS. 6A to 6C. This OpenFlow switching technology employs the OFC 51 and at least two OFSs 52 and 53. The OFC 51 is configured to handle a complicated process such as path control, and OFSs 52 and 53 are configured to handle a simple process such as transferring a frame, a unit of data transfer.

The OFC 51 controls instructions related to addition, deletion, and change of information in flow tables maintained by the OFSs 52 and 53. The OFSs 52 and 53 perform processes such as transferring frames in accordance with the respective flow tables.

Each of the flow tables includes flow entries representing control rules of the frame. The flow table includes a component for identifying each flow entry, three types of information including a condition, statistical information, and a process corresponding to the flow entry. The component is a field in which mutually identifiable content such as a "flow entry 1", a "flow entry 2", or the like is entered. The condition is a header field to identify each communication, and hence includes items of information illustrated in FIG. 6C to specify the communication.

The statistical information is a field to manage statistical information including the frequency of communications that matches the condition, and the progress of the communication process. The process is a field to define a process with respect to a frame. Examples of the process include transferring (forward), entering a specified queue (enqueue), discarding (dr and rewriting a value of the specified field (modify-field). Examples of the process further include execution of a specified process for a specific group (group), and addition or removal of a tag (push-tag, pop-tag). Each of the processes may further include details. For example, in the above-described transferring (forward), transferring to all the physical ports, and encapsulating and transmitting to the controller may be specified.

Examples of the condition include information represented by the four layers of the hierarchical layers (layer 1 to layer 4, and metadata illustrated in FIG. 6C. The information of the layer 1 includes a physical port of the switch, the information of the layer 2 includes a MAC address of the destination, a MAC address of the source, a type of Ethernet (registered trademark), an ID of the virtual LAN (VLAN), and priority of the virtual LAN. The information of the layer 3 includes an IP address of the destination, an IP address of the source, the protocol number, and priority of IP packet (ToS). The information of the layer 4 includes a source TCP/UDP port number, and a destination TCP/UDP port number. The layers 2 and 3 may include a multi-protocol label switching (MPLS) label, and a MPLS traffic class.

Figure 7:
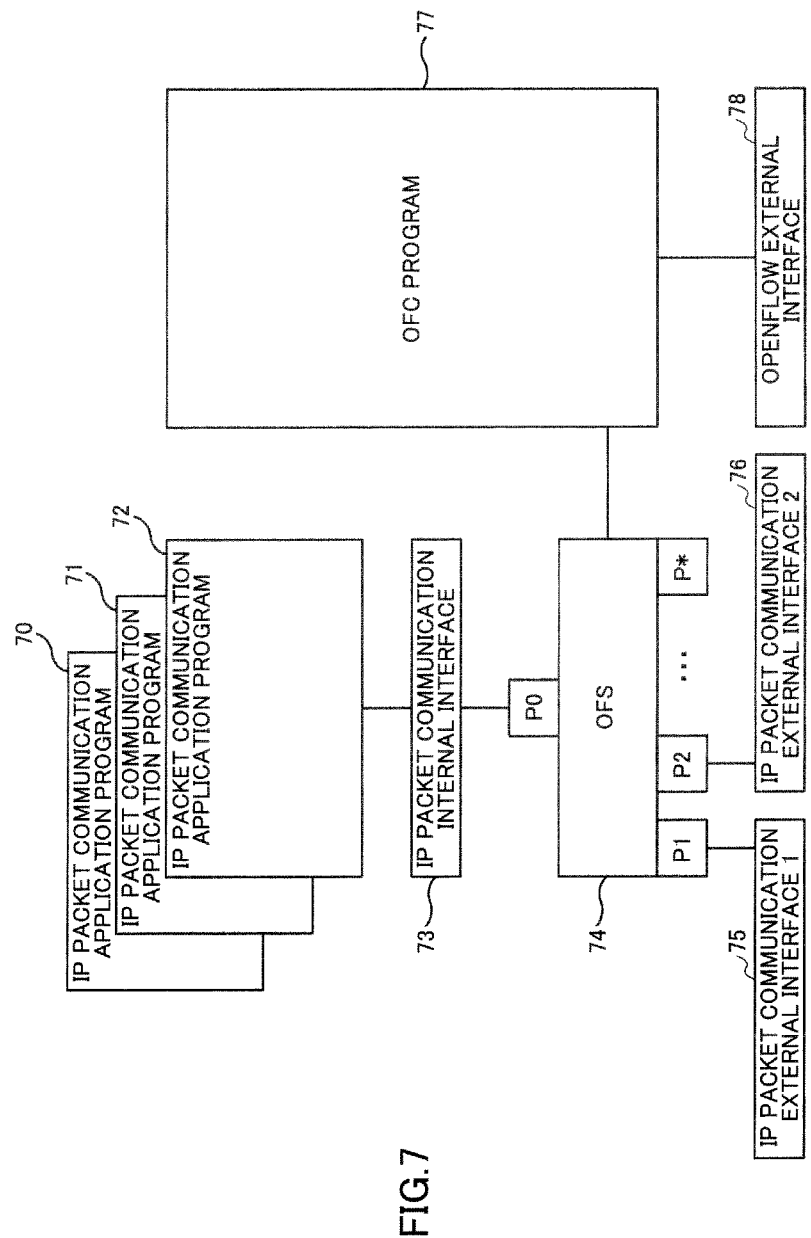
FIG. 7 is a diagram illustrating a specific implementation example of the communication apparatus.

FIG. 7 illustrates an implementation example of the communication apparatus 10 actually employing the OpenFlow switching. The applications providing primary functions of the communication apparatus 10 are IP packet communication application programs 70 to 72, which may be implemented in the third or above layers in the OSI model illustrated in FIG. 4. In FIG. 7, three IP packet communication application programs 70 to 72 are illustrated. However, alternatively, one or two IP packet communication application programs may be implemented, or four or more IP packet communication application programs may be implemented.

The IP packet communication application programs 70 to 72 include IP addresses for external communications, and these IP addresses may be used for performing communications with the communication apparatus 11. The IP packet communication application programs 70 to 72 may, when executed by a not-illustrated CPU, function as the information processing parts 32 illustrated in FIG. 3. The IP packet communication application programs 70 to 72 are connected the IP packet communication internal interface 73 configured to handle the second or lower layers of the hierarchical layers of the OSI model, and perform communications via the IP packet communication internal interface 73. The IP packet communication internal interface 73 corresponds to the internal interface 33 illustrated in FIG. 3.

The IP packet communication internal interface 73 is connected to a port P0 of the OFS 74 that serves as the switch 28 illustrated in FIG. 3. Other ports P1 and P2 of the OFD 74 are connected to IP packet communication external interfaces 75 and 76.

The communication apparatus 10 includes an OFC program 77 and a dedicated OpenFlow external interface 78 for performing communications with the OFC program 77. The OFC program 77 functions, when executed by the CPU 20, as the information acquisition part 30 or the controller 31 illustrated in FIG. 3.

When the communications are performed between the OFS 74, the OFS 74 being included in the communication apparatus 11, and the OFC program 77, the communications may require the TCP/IP separated from the external data communications. Hence, in the above communications, an OpenFlow channel-specific IP address differing from the IP address for use in the external data communications may generally be used. When the OFS 74, the OFS 74 being included in the communication apparatus 11, and the OFC program 77 are disposed closely to one another, a local address such as "192.168.0.1" assigned by the DHCP or the like may be used. In this case, a Local address of IPv6 may be used. The OFS 74 and OFC program 77 operating within the communication apparatus 10 may perform communication using an internal Loopback address such as "127.0.0.1".

The communication apparatus 10 that is planning to acquire information associated with the communication paths executes the PFC program 77 to perform communications using the OpenFlow channel IP address, the OpenFlow external interface 78, and the like to acquire such information associated with the communication paths.

These interfaces and switches may, as described above, all be physical interfaces and physical switches, or alternatively, some of these interfaces and switches may be virtual interface or virtual switches. However, it tray be preferable that some of these interfaces and switches be virtual interface or virtual switches in view of cost efficiency. Further, it may be preferable that the data plane parts include hardware acceleration so as to improve the performance of the communications. The switches may be configured to include functions to convert a local IP address into a global IP address such as network address translation (NAT) router.

Figure 8:
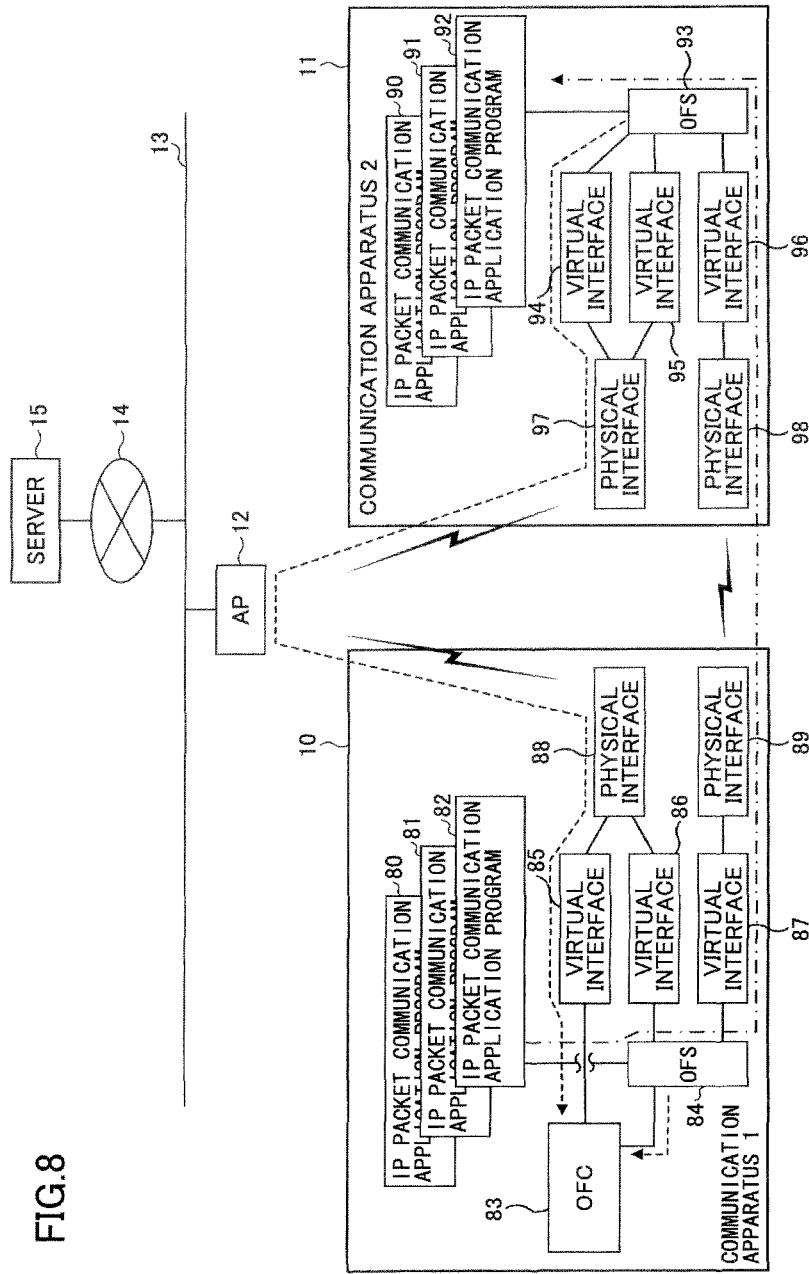
FIG. 8 is a diagram illustrating operational examples of the communication apparatus and another communication apparatus in the communication system.

Next, an illustration is given of actual operations of the communication apparatus 10 and the communication apparatus 11 in the communication system with reference to FIG. 8. The communication system includes, as illustrated in FIG. 1, the communication apparatus 10, the communication apparatus 11, the AP 12, the local network 13, the global network 14, and the server 15. The communication apparatus 10 and the communication apparatus 11 include approximately the same hardware and software configuration, and hence each of them includes almost the same configuration as the implementation example illustrated in FIG. 7.

The communication apparatus 10 includes IP packet communication application programs 80 to 82, an OFC 53, an OFS 84, virtual interfaces 85 to 87, and physical interfaces 88 and 69. The IP packet communication application programs 80 to 82 are connected to the OFS 84, and the virtual interfaces 86 and 87 are connected to the OFS 84. The OFS 84 is configured to perform communications with the OFC 83 via the internal Loopback address. Further, the CEO 83 is connected to the virtual interface 55, and the virtual interface 85 is connected to the physical interface 88 to which the virtual interface 86 is connected. The virtual interface 87 is connected to the physical interface 89.

The physical interface 88 serves as wireless communication interface to perform communications using 5 GHz band, and is configured to perform communications with the communication apparatus 11 or the server 15 via the AP 12. The physical interface 89 serves as wireless communication interface to perform direct communications at an extremely close range using 60 GHz band, and is configured to perform direct communications with the communication apparatus 11 disposed at a position extremely close to the communication apparatus 10.

The communication apparatus 11 includes IP packet communication application programs 90 to 92, an OFC 93, virtual interfaces 94 to 96, and physical interfaces 97 and 98, which is almost the same configuration as the communication apparatus 10 except that the communication apparatus 11 does not include the OFC. Details of the components are similar to those of the communication apparatus 10, and hence, duplicated illustrations are omitted from the specification.

In FIG. 8, the physical interfaces 88 and 97 serve as wireless physical interfaces for use in ordinary IP packet communications such as the Internet, and the physical interfaces 89 and 98 serve as wireless physical interfaces for use in video and audio broadband streaming. The virtual interfaces 85 and 94 serve as interfaces configured to assign local IP addresses to perform OpenFlow channel communications. The virtual interfaces 86 and 95 serve as interfaces configured to assign global IP addresses so as to access a local network 13 such as an internal corporate LAN or the server 15 such as the Internet server.

When the communication apparatus 10 operates as a content server for streaming, the communication apparatus 11 operates as a client terminal, and the OFS 84 of the communication apparatus 10 establishes connections with the OFC 83 using the internal Loopback address. Further, the OFS 93 of the communications apparatus 11 establishes connections with OFC 83 via the virtual interface 94, the AP 12, and the virtual interface 85 using the OpenFlow channel IP address. Hence, the information associated with communication paths such as capabilities of ports, or statuses may be acquired from the OFS 84 and OFS 93. The communication path in this case is illustrated with a broken line in FIG. 8.

The OFF 83 of the communication apparatus 10 selects a communication interface based on the acquired information. The selection is made for each of the communication apparatuses 10 and 11. The OFC 83 reports the information about the selected communication interface to the OFS 84 and the OFS 93 to cause them to switch to the selected communication interface. FIG. 8 illustrates a case where streaming videos are distributed from the communication apparatus 10 to the communication apparatus 11. Hence, in the communication apparatus 10, the OFS 84 switches to the virtual interface 87 and the physical interface 89. Further, in the communication apparatus 11, the OFS 93 switches to the virtual interface 96 and the physical interface 98. Thus, streaming distribution may be performed via the communication path illustrated with a dash-dot line in FIG. 8.

In FIG. 8, the communication paths are controlled by the OFC 83 implemented in the communication apparatus 10. However, the OFC 83 may be implemented in the other communication apparatus 11 such that the communication paths may be controlled by the communication apparatus 11. The control of the communication paths may be implemented and executed as one function of the server 15 or other apparatuses connected to the network capable of performing communications via the AP 12. However, in this case, "OFF" is set for the operations of the OFC 83 implemented in the communication apparatus 10 to disable the operations of the OFC 83.

When the communication paths are controlled by the server 15 or other apparatuses, implementation of the OFC 83 may not be required. However, in a case of a connection configuration to establish direct connection to distribute streaming such as a personal area network (PAN), it may be impractical to control the communication paths via the third apparatus other than the communication apparatus 10 and the communication apparatus 11. Hence, it may be necessary to implement a functional module corresponding to the OFC in one of the communication apparatus 10 and the communication apparatus 11.

Figure 9:
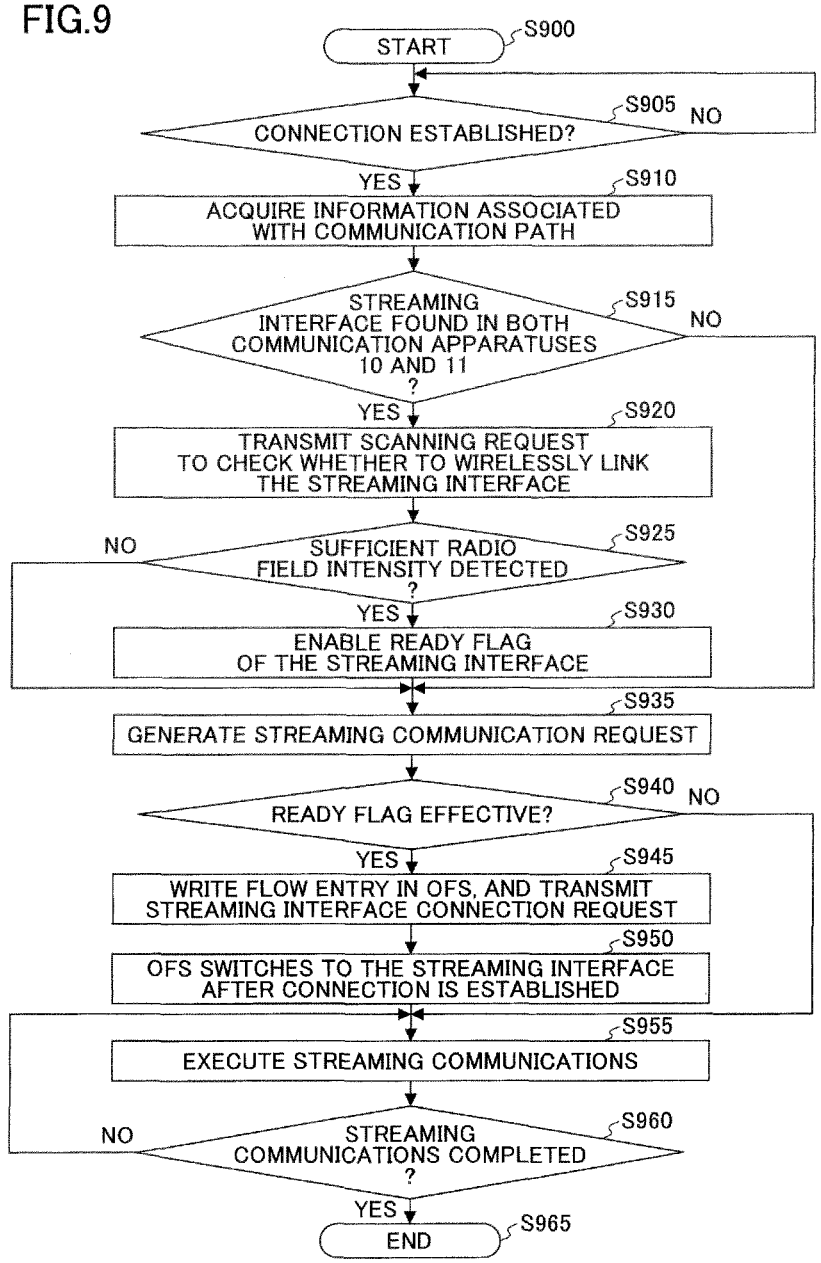
FIG. 9 is a flowchart illustrating an example of a process executed by the communication apparatus illustrated in FIG. 7.

FIG. 9 is a flowchart illustrating an example of a process that is executed by the communication apparatus 10. This process starts with step S900, and in a subsequent step S905, the OFC 83 awaits connection requests from the OFS 84 and the OFS 93 included in the communication apparatus 11, receives the connection requests from the OFS 84 and the OFS 93, and determines whether connections with OFS 84 and the OFS 93 are established. The OFS 84 transmits the connection request to the OFC 83 using the internal Loopback address, and the OFS 93 transmits the connection request to the OFC 83 using the OpenFlow channel IP address. The determination in step S905 is repeatedly performed until the above connections are established.

In step S910, when the connections are established, the OFSs 84 and 83 report to the OFC 83 information associated with the communication path such as capabilities of the ports and statuses based on the OpenFlow requirement. As a result, the OFC 83 acquires such information. In this example, streaming communications such as videos are performed. Hence, in step S915, whether the acquired information includes streaming interfaces is determined.

When the streaming interfaces are present in both the communication apparatuses 10 and 11, step S920 is processed. When the streaming interfaces are not present in the communication apparatuses 10 and 11, or only present in one of the communication apparatuses 10 and 11, step S935 is processed. In step S920, the scanning of whether the streaming interface may be wirelessly linked is requested. That is, a scanning request to determine whether the interface found is capable of performing wireless communications is transmitted. On receiving the scanning request, it is possible to determine whether the interface found is actually capable of performing wireless communications by transmitting and receiving optional packets.

In step S925, whether sufficient radio field intensity is detected is determined based on the scanning performed. For example, a threshold may be provided with respect to the radio field intensity, and whether the radio field intensity is greater than the threshold may be determined. When it is determined that the radio field intensity is greater than the threshold, step S930 is processed. However, when it is not determined that the radio field intensity is greater than the threshold, step S935 is processed. In step S930, a ready flag indicating that the streaming interface is ready is enabled.

In step S935, a request for executing the streaming communications is generated. In step S940, whether the ready flag for the streaming interface is enabled is determined. When the ready flag for the streaming interface is enabled, step S945 is processed, and flow entries indicating that the streaming data are transmitted to the communication apparatus 11 are written in the respective flow tables of the OFSs 84 and 93. Then, the OFSs 64 and 93 are requested to switch to the respective streaming interfaces. In step S950, when receiving the requests, the OFSs 84 and 93 switch to the streaming interfaces.

When the ready flag is not enabled in step S940, or after switching to the streaming interface in step S950, step S955 is processed so as to execute the streaming communications. In the streaming communications, video data are sequentially transmitted as packets, and the transmitted video data are reproduced in the communication apparatus 11. In step S960, whether the streaming communications are completed is determined. When the streaming communications are not completed, step S955 is processed so as to continue the streaming communications. When, on the other hand, the streaming communications are completed, step S965 is processed so as to end the process of FIG. 9.

When the ready flag for the streaming interface is not enabled in step S940, it is not possible to switch to the streaming interface. Hence, the streaming communications are performed using the ordinary IP packet communication interfaces. In the example of FIG. 9, the process returns from step S960 to step S955. However the process is not limited to this example. The process may return from step S960 to step S920. In this case, when sufficient radio field intensity is observed, the OFS may be switched to the streaming interface, and when sufficient radio field intensity is not observed, the OFS may be switched to the original IP communication interface.

In the current OpenFlow specifications, wireless communication port status or the like is not included in the port status to be acquired. In addition, the wireless interface control is not defined in the standard message. Hence, these may be controlled by using a symmetric message vendor extension area or by the control outside the OpenFlow specification. The process flow illustrated in FIG. 9 is an example of the process performed by the PFC 83. Hence, the order of switching control or establishment of the wireless connections may be altered in accordance with restrictions in hardware control.

The embodiment of the present invention provides a communication apparatus, and a communication method employing two or more communication apparatuses that are capable of controlling virtual communication paths inside the communication apparatuses in accordance with respective ports and capabilities of the communication apparatuses independent of the IP communication applications so as to maximize communication efficiencies. In this case, the communication controls performed by the OpenFlow, such as the streaming TCP port number or the like being included as a condition in the flow table, or rewriting MAC addresses for wired-wireless bridging operations, may optimally be utilized. Accordingly, anticipated communications may be implemented.

The embodiment of the present invention may implement flexible and optimal control of the communication to maximize the performance of the communication functions.

The communication apparatus and the communication method are described in detail with reference to the embodiments and examples illustrated in the accompanying drawings. However, the invention is not limited to those specifically described embodiments or examples. Various alterations and modifications may be made without departing from the scope of the claimed invention.

The present invention is not limited to the specifically disclosed embodiments, and variations and modifications may be made without departing the scope of the present invention.

The present application is based on Japanese Priority Application No. 2013-263972 filed on Dec. 20, 2013, the entire contents of which are hereby incorporated herein by reference.

What is claimed is:

1. A communication apparatus capable of performing communications with another communication apparatus, the communication apparatus comprising:
   a plurality of communication interfaces using different communication paths;
   an information acquisition part configured to acquire information associated with the communication paths available to the communication apparatus and the other communication apparatus;
   a controller configured to select one of the communication interfaces for use in the communications with the other communication apparatus based on the information associated with the communication paths acquired from the information acquisition part; and a switcher configured to switch the communication interface used by the communication apparatus to the communication interface selected by the controller, wherein the controller reports the selected communication interface to said other communication apparatus, causing said other communication apparatus to switch to the selected communication interface so that the communication apparatus and said other communication apparatus perform communications with each other on the same communication path, and where each of the different communication paths has an associated frequency band, and the communication apparatus and the other communication apparatus communicate with each other over the same communication path using the associated frequency band.

2. The communication apparatus as claimed in claim 1, wherein the information acquisition part acquires, as the information associated with the communication paths, either one of, or both of a frequency channel of the communication apparatus and a frequency channel of the other communication apparatus.

3. The communication apparatus as claimed in claim 1, wherein one or some of the communication interfaces are virtual interfaces.

4. The communication apparatus as claimed in claim 1, wherein the controller is an OpenFlow controller used in an OpenFlow switching technology.

5. The communication apparatus as claimed in claim 1, wherein the controller is disabled so as not to perform an operation to select the communication interface.

6. The communication apparatus as claimed in claim 1, further comprising:

an information processing part configured to output transmission information to the other communication apparatus and receive reception information from the other communication apparatus; and an internal interface connected to the switcher, and configured to transfer the transmission information from the information processing part to the selected communication interface, or to transfer the reception information from the selected communication interface to the information processing part.

7. The communication apparatus as claimed in claim 6, wherein the switcher is a physical switch or a virtual switch.

8. The communication apparatus as claimed in claim 6, wherein the switcher is an OpenFlow switch used in an OpenFlow switching technology.

9. The communication apparatus as claimed in claim 1, wherein the controller selects the communication interface based on types of data packets that are to be transmitted or received, and in a case where streaming video or audio data are transmitted, the controller selects a streaming interface.

10. A communication method executed by a communication apparatus capable of performing communications with another communication apparatus, the communication apparatus and the another communication apparatus including a plurality of communication interfaces using different communication paths, the communication method comprising:

acquiring information associated with the communication paths using different communication interfaces available to the communication apparatus and the other communication apparatus;

selecting, by a controller of the communication apparatus, one of the communication interfaces for use in the communications with the other communication apparatus based on the information associated with the communication paths acquired from the information acquisition part;

switching the communication interface used by the communication apparatus to the communication interface selected by the controller, reporting, by the controller, the selected communication interface to said other communication apparatus, to cause said other communication apparatus to switch to the selected communication interface so that the communication apparatus and said other communication apparatus perform communications with each other on the same communication path, and communicating, where each of the different communication paths has an associated frequency band, between the communication apparatus and the other communication apparatus over the same communication path using the associated frequency band.

11. A communication system comprising:

a first communication apparatus; and a second communication apparatus, the first and the second communication apparatuses performing communications with each other, wherein each of the first communication apparatus and the second communication apparatus includes a plurality of communication interfaces using different communication paths, wherein the first communication apparatus comprising:

an information acquisition part configured to acquire information associated with the communication paths available to the first communication apparatus and the second communication apparatus, a controller configured to select one of the communication interfaces for use in the communications with the second communication apparatus based on the information associated with the communication paths acquired from the information acquisition part, and a switcher configured to switch the communication interface used by the first communication apparatus to the communication interface selected by the controller, and wherein the controller reports the selected communication interface to the second communication apparatus, causing the second communication apparatus to switch to the selected communication interface so that the first communication apparatus and the second communication apparatus perform communications with each other on the same communication path, and where each of the different communication paths has an associated frequency band, and the first communication apparatus and the second communication apparatus communicate with each other over the same communication path using the associated frequency band.

* * * * *